United States Patent [19]

Nachtkamp et al.

[11] Patent Number: 4,743,470

[45] Date of Patent: May 10, 1988

[54] SPREADING PASTES CONTAINING POLYURETHANE PLASTICS AND A PROCESS FOR THE PRODUCTION OF POLYURETHANE COATINGS PERMEABLE TO WATER VAPOR

[75] Inventors: Klaus Nachtkamp, New Martinsville, W. Va.; Wilhelm Thoma, Leverkusen, Fed. Rep. of Germany; Josef Pedain, Cologne, Fed. Rep. of Germany; Walter Schröer; Rolf Langel, both of Leverkusen, Fed. Rep. of Germany

[73] Assignee: Bayer Aktiengesellschaft, Bayerwerk, Fed. Rep. of Germany

[21] Appl. No.: 829,892

[22] Filed: Feb. 18, 1986

[30] Foreign Application Priority Data

Mar. 2, 1985 [DE] Fed. Rep. of Germany ....... 3507467
Jun. 22, 1985 [DE] Fed. Rep. of Germany ....... 3522464

[51] Int. Cl.$^4$ ............... D06M 15/564; D06M 15/568; D06M 15/572; D06M 15/576; D06M 15/653
[52] U.S. Cl. .................... 427/246; 428/290; 428/423.4
[58] Field of Search .............. 427/245, 246, 389, 353, 427/393.4; 8/115.6; 428/290, 423.4; 528/79, 83; 525/123, 330.2

[56] References Cited

U.S. PATENT DOCUMENTS

| | | |
|---|---|---|
| 2,244,703 | 6/1941 | Hubbuch ........................... 525/330.2 |
| 3,015,650 | 1/1962 | Schollenberger ..................... 528/83 |
| 3,472,825 | 10/1969 | Walter et al. ..................... 525/330.2 |
| 3,484,281 | 12/1969 | Guenthner et al. .............. 428/423.4 |
| 3,666,542 | 5/1972 | Kigane et al. ......................... 427/246 |
| 3,983,291 | 9/1976 | Chang ............................... 428/423.4 |
| 4,137,360 | 1/1979 | Reischl ................................ 427/246 |
| 4,303,773 | 12/1981 | Ganster et al. ......................... 528/64 |
| 4,331,778 | 5/1982 | Sommerfeld et al. ............... 521/129 |
| 4,401,801 | 8/1983 | Pedain et al. .......................... 528/67 |
| 4,539,006 | 9/1985 | Langford ............................ 427/389 |
| 4,581,388 | 4/1986 | Rasshofer et al. ..................... 528/79 |

FOREIGN PATENT DOCUMENTS

| | | |
|---|---|---|
| 1694059 | 6/1971 | Fed. Rep. of Germany . |
| 1145200 | 3/1969 | United Kingdom . |
| 1210504 | 10/1970 | United Kingdom . |
| 1248656 | 10/1971 | United Kingdom . |

*Primary Examiner*—Veronica P. Hoke
*Attorney, Agent, or Firm*—Gene Harsh; Joseph C. Gil; Thomas W. Roy

[57] ABSTRACT

This invention relates to spreading pastes containing polyurethanes which are prepared from special synthesis components selected from the group of silicone resins, polyethers or polyesters containing aromatic segments or perfluorocarbon resins. The spreading pastes also contain organic solvents and optionally non-solvents for the polyurethanes so that when the coatings are used to coat textile substrates according to the direct or transfer process, the coatings may be cured based on the principle of evaporation coagulation.

10 Claims, No Drawings

SPREADING PASTES CONTAINING POLYURETHANE PLASTICS AND A PROCESS FOR THE PRODUCTION OF POLYURETHANE COATINGS PERMEABLE TO WATER VAPOR

BACKGROUND OF THE INVENTION

1. Field of the Invention

This invention relates to spreading pastes containing polyurethane plastics and to their use as a new process for the production of coatings permeable to water vapor on fabric or leather substrates by the direct or transfer method based on the principle of evaporation coagulation.

2. Description of the Prior Art

Fabric or leather coatings which are highly permeable to water vapor and, at the same time, highly waterproof are of increasing interest, above all in the shoe and clothing fields. The advantages of coated materials such as these is that the clothing produced from them on the one hand affords optimal protection, but on the other hand allows bodily moisture to escape in the form of water vapor. These properties are extremely valuable both from the sanitation and hygiene point of view and also from the point of view of wearing comfort.

An important process for producing microporous coatings permeable to water vapor is the so-called bath coagulation process described, for example, in DE-AS No. 1,270,276 and in DE-AS No. 1,769,277. In this process, a substrate is coated with a polyurethane or polyurethane urea dissolved in an organic solvent and the coated product is introduced into a bath of a non-solvent (for example, water) miscible with the solvent. Coagulation of the polyurethane is obtained by extraction of the solvent by the non-solvent.

The disadvantages of this process are that very large quantities of non-solvent are required for the necessary complete removal of the solvent and that the process is time-consuming. In addition, special, relatively expensive apparatus is required for carrying out this process and also for working up the solvent/non-solvent mixtures accumulating therein.

Accordingly, there have been no shortage of attempts to produce coatings permeable to water vapor by simple direct or transfer coating using conventional fabric coating machines. Most of these attempts are based on the technique of evaporation coagulation. In principle, this process is carried out by adding to a polymer dissolved in a volatile solvent a certain quantity of a less volatile non-solvent and spreading the resulting solution, dispersion or suspension onto a substrate. The coating is dried by careful heating, during which the volatile solvent preferentially evaporates first. The result is that the polymer coagulates in the layer and, after final drying, shows a microporous structure. This process is described, for example, in DE-PS No. 1,694,059. The polyurethanes used therein are colloidally dissolved in volatile organic solvents, such as for example tetrahydrofuran or methylethylketone, and are mixed with organic non-solvents having a higher evaporation index, such as cleaning spirit. A similar process is described in CH-PS No. 481,971 with the added feature that water is included among the non-solvents mentioned therein for addition to the polymer solutions. Another example of this approach is the process according to DE-PS No. 2,004,276 which uses hydrophilic polyurethanes based on aromatic diisocyanates which contain certain proportions of polyoxyethylene compounds as synthesis components. Solutions of these polyurethanes in certain organic solvents, such as methylethylketone for example, are mixed with water as non-solvent and applied to a substrate, after which the coating is coagulated by selective evaporation and subsequently dried.

However, the above-mentioned processes based on the principle of evaporation coagulation also have serious disadvantages. A major disadvantage is that selective evaporation of the more volatile solvent components is time-consuming and requires extremely precise temperature control. Accordingly, handling of the corresponding products in the coating machines is complicated and, above all, only possible at slow speeds. Another serious disadvantage which applies, in particular to the process according to DE-PS No. 2,004,276, is that the polyurethane solutions or suspensions described therein are difficult to process. Although they have low solids contents, these products are highly viscous, even before the addition of water which is made at the time of application. They are described as "sludge-like suspensions", show a pronounced tendency towards premature drying with formation of gel particles and specks and are therefore difficult to handle by the coater. In addition, the coatings according to the last of the above-mentioned patents are attended by the disadvantage of poor fastness to light.

Accordingly, the object of the present invention is to provide a process for the production of coatings permeable to water vapor which may be carried out by the direct or transfer method in conventional coating machines and which does not have any of the disadvantages described in the foregoing.

This object is achieved by the multi-phase stable spreading pastes according to the invention which are described in detail in the following and by their use for coating by the direct or transfer method on the principle of evaporation coagulation.

The invention is based on the surprising observation that multi-phase stable spreading pastes which may be processed surprisingly easily, quickly and safely in conventional coating machines to form microporous coatings can be obtained from basically hydrophobic polyurethanes or polyurethane ureas in which certain silicone, polyether, polyester or perfluorocarbon resin segments are incorporated and which are dissolved in organic solvents, more especially by the addition of certain non-polyurethane resins containing lateral or terminal carboxylate groups which are defined in detail hereinafter. The base polymers according to the invention are preferably polyurethane ureas based on aliphatic polyisocyanates so that light-stable coatings permeable to water vapor are advantageously obtained.

The process according to the invention has the advantage that the polyurethane solutions are low in viscosity before addition of the water and, accordingly, are easy and safe to handle by the coater who only prepares the ready-to-use spreading pastes therefrom shortly before application. In addition, the spreading pastes produced by the process according to the invention by the addition of resin containing carboxylate groups and water are distinguished by particularly good stability in storage and are safe to process.

SUMMARY OF THE INVENTION

Accordingly, the present invention relates to a process for the production of coatings permeable to water vapor on fabric or leather substrates by the direct or transfer method based on the principle of evaporation coagulation using optionally pigmented spreading pastes containing polyurethane plastics, characterized in that the spreading pastes are multiphase mixtures of (A) at least about 5% by weight and preferably about 5 to 50% by weight of hydrophobic polyurethanes and/or polyurethane ureas in which about 1 to 30% by weight, preferably about 1 to 20% by weight and, more preferably, about 1.5 to 15% by weight, based on the weight of said hydrophobic polyurethanes, of special synthesis components selected from silicone resins, polyethers containing aromatic segments, polyesters containing aromatic segments and/or perfluorocarbon resins are incorporated, (B) 0 to about 30% by weight of hydrophobic polyurethanes and/or polyurethane ureas which are synthesized without the special synthesis components mentioned under (A), (C) 4.5 to 50% by weight of organic solvents for (A) and (B), (D) 0 to about 40% by weight of organic non-solvents for (A) and (B), (E) 0 to about 10% by weight, preferably about 0.5 to 10% by weight and more preferably about 0.5 to 5% by weight of polymers which are free from urethane and urea groups and which contain lateral and/or terminal carboxyl groups completely or partly neutralized with bases, (F) about 10 to 70% by weight of water and (G) 0 to about 5% by weight of crosslinking agents, hydrophobicizing agents, stabilizers active against discoloration and degradation and/or other auxiliaries.

The present invention also relates to the spreading pastes defined above in the form of multiphase stable mixtures of (A) to (G).

DETAILED DESCRIPTION OF THE INVENTION

The percentages (A) to (G) should always add up to 100.

The spreading pastes may also contain dyes, pigments, coloring powders and, optionally, fillers.

The spreading pastes used for carrying out the process according to the invention are preferably prepared by mixing solutions of the polyurethanes or polyurethane ureas (A) and, optionally, (B) in the organic solvents (C), optionally containing the organic non-solvents (D) and the coating auxiliaries (G), with aqueous or organic solutions or dispersions of the polymers (E) containing completely or partly neutralized carboxyl groups and then optionally adding the rest of the water (F).

Components (A) and (B) are preferably polyurethane ureas based on aliphatic polyisocyanates.

The polyurethanes or polyurethane ureas (A) are polyadducts obtainable in a known manner from polyisocyanates and compounds containing active hydrogen atoms. However, the principal characteristic of these polymers is that they are hydrophobic, i.e. do not give stable dispersions or solutions with water unless further auxiliaries are added, and that they contain certain synthesis components from the group comprising silicone resins, polyethers containing aromatic segments, polyesters containing aromatic segments and/or perfluorocarbon resins.

Starting materials for producing the polyurethanes or polyurethane ureas (A) include (1) organic polyisocyanates, preferably diisocyanates corresponding to the formula $Q(NCO)_2$ where Q is an aliphatic hydrocarbon radical containing 4 to 12 carbon atoms, a cycloaliphatic hydrocarbon radical containing 6 to 15 carbon atoms, an aromatic hydrocarbon radical containing 6 to 15 carbon atoms or an araliphatic hydrocarbon radical containing 7 to 15 carbon atoms. A detailed list of suitable diisocyanates can be found, for example, in DE-OS No. 3,134,112, in DE-OS No. 2,854,384 and in DE-OS No. 2,920,501.

Examples of preferred diisocyanates of the type in question are tetramethylene diisocyanate, hexamethylene diisocyanate, 1-methyl-1,5-pentane diisocyanate, 2-methyl-2,5-pentane diisocyanate, 2-ethyl-1,4-butane diisocyanate, dodecamethylene diisocyanate, 1,3- and 1,4-diisocyanatocyclohexane, 1-methyl-2,4- and -2,6-diisocyanatocyclohexane, 3-isocyanatomethyl-3,5,5-trimethylcyclohexylisocyanate (isophorone diisocyanate), 4,4'-diisocyanatodicyclohexylmethane, 4,4'-diisocyanato-2,2-dicyclohexylpropane, mono-, bis-, tris- or tetraalkyl-dicyclohexylmethane-4,4'-diisocyanates, lysine alkylester diisocyanates, oligomers or homopolymers or m- or p-isopropenyl-$\alpha,\alpha$-dibenzyl diisocyanates according to EP-A 1,130,313, 1-alkyl-2-isocyanatomethyl-isocyanatocyclohexanes, 1-alkyl-4-isocyanatomethyl-isocyanatocyclohexanes according to EP-A No. 128,382, 1,4-diisocyanatobenzene, 2,4- or 2,6-diisocyanatotoluene or mixtures of these isomers, 4,4'- and/or 2,4'- and/or 2,2'-diisocyanatodiphenylmethane, 4,4'-diisocyanato-2,2-diphenylpropane, p-xylylene diisocyanate and $\alpha,\alpha,\alpha',\alpha'$-tetramethyl-m- or -p-xylylene diisocyanate and mixtures of these compounds.

The (cyclo)aliphatic diisocyanates mentioned above are particularly preferred.

It is of course also possible to use the higher functional polyisocyanates known per se in polyurethane chemistry or even modified polyisocyanates known per se, for example polyisocyanates containing carbodiimide groups, allophanate groups, isocyanurate groups, urethane groups and/or biuret groups, in the process according to the invention.

(2) Further starting materials include water-insoluble polyhydroxyl compounds of the type known per se, in polyurethane chemistry having molecular weights above 400, for example in the range from 400 to about 10,000 and preferably in the range from about 500 to 5000 and melting points below 60° C., preferably below 45° C. The corresponding dihydroxy compounds are preferably used. Compounds having a functionality of 3 or higher in the context of the isocyanate polyaddition reaction may be used in small quantities to obtain a certain degree of branching. Trifunctional or higher polyisocyanates may also be used for the same purpose, as mentioned above. In addition, the corresponding polyhydroxyl compounds preferably consist predominantly of aliphatic synthesis components. Preferred hydroxyl compounds are the hydroxypolyesters, hydroxypolyethers, hydroxypolythioethers, hydroxypolycarbonates and/or hydroxypolyesteramides known per se, in polyurethane chemistry. The polyesters containing hydroxyl groups which may be used in accordance with the invention include reaction products of polyhydric, preferably dihydric and, optionally also trihydric alcohols with polybasic, preferably dibasic carboxylic acids. If trihydric or higher alcohols are used for producing the polyesters, monobasic carboxylic acids may also be used. Conversely, where higher carboxylic acids are used, monohydric alcohols may be employed.

Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids are preferably aliphatic and/or cycloaliphatic and may optionally be substituted, for example by halogen atoms, and/or unsaturated. Examples of suitable polycarboxylic acids include succinic acid, adipic acid, suberic acid, azelaic acid, sebacic acid, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids.

Monobasic carboxylic acids which may optionally be used are preferably saturated or unsaturated fatty acids such as 2-ethylhexanoic acid, palmitic acid, stearic acid, oleic acid, ricinoleic acid, linoleic acid, ricinene acid, linolenic acid and also commercial fatty acid mixtures of the type obtained from natural raw materials (for example, coconut oil, linseed oil, soya oil, castor oil).

Suitable polyhydric alcohols include ethylene glycol, 1,2- and 1,3-propane diol, 1,4-, 2,4- and/or 2,3-butane diol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, diethylene glycol, dipropylene glycol, propylene glycols, dibutylene glycol and polybutylene glycols. The polyesters may also contain terminal carboxyl groups. Polyesters of lactones such as $\epsilon$-caprolactone or hydroxycarboxylic acids such as $\omega$-hydroxycaproic acid may also be used.

The polyethers preferably containing two hydroxyl groups suitable for use in accordance with the invention are also known per se, and may be obtained by polymerization of tetrahydrofuran or epoxides such as ethylene oxide, propylene oxide, butylene oxide, styrene oxide or epichlorohydrin, on their own, for example in the presence of $BF_3$, or by the addition of these epoxides, optionally in admixture or successively, onto starter components containing reactive hydrogen atoms such as alcohols and amines, for example, water, ethylene glycol or 1,2-propylene glycol.

In order to guarantee the crucial characteristic of hydrophobicity of the polyurethanes or polyurethane ureas according to the invention, the polyethers used as synthesis components should only contain at most so many ethylene oxide units that the resulting polyurethane ureas contain less than 2% by weight of oxyethylene segments $-CH_2-CH_2-O$. Polyethers free from ethylene oxide are preferably used for producing the polyurethanes or polyurethane ureas according to the invention.

Polyethers modified by vinyl polymers of the type obtained, for example, by polymerization of styrene or acrylonitrile in the presence of polyethers (U.S. Pat. Nos. 3,383,351, 3,304,273, 3,523,093, 3,110,695, DE-PS No. 1,152,536) are also suitable. The higher polyethers which may also be used are similarly formed by the alkoxylation known per se, of higher starter molecules such as ammonia, ethanolamine, ethylene diamine, trimethylol propane, glycerol or sucrose.

Among the polythioethers, reference is made in particular to the condensates of thiodiglycol on its own and/or with other glycols, dicarboxylic acids, formaldehyde, aminocarboxylic acids or amino alcohols.

Suitable polycarbonates containing hydroxyl groups are those known per se, which may be obtained, for example, by reaction of diols such as 1,3-propane diol, 1,4-butane diol and/or 1,6-hexane diol, with phosgene or diarylcarbonates such as diphenylcarbonate.

The polyester amides and polyamides include the predominantly linear condensates obtained from polybasic, saturated and unsaturated carboxylic acids or their anhydrides and polyhydric, saturated and unsaturated aminoalcohols, diamines, polyamines and mixtures thereof. Polyhydroxyl compounds already containing urethane or urea groups may also be used.

Representatives of the above-mentioned polyisocyanates and hydroxyl compounds suitable for use in the process according to the invention are described, for example, in High Polymers, Vol. XVI, "Polyurethanes, Chemistry and Technology" by Saunders-Frisch, Interscience Publishers, New York/London, Vol. I, 1962, pages 32–42 and 44–54 and Vol. II, 1964, pages 5–6 and 198–199, and also in Kunststoff-Handbuch, Vol. VII, Vieweg-Hochtlen, Carl-Hanser-Verlag, Munich, 1966, for example on pages 45–71.

(3) According to the invention, compounds having a functionality of at least 2 in the isocyanate addition reaction selected from silicone resins (3a), polyethers containing aromatic molecule segments (3b), polyesters containing aromatic molecule segments (3c) and/or perfluorocarbon resins (3d) may be used in the production of the hydrophobic polyurethane ureas.

More particularly, the compounds (3a) are compounds containing polysiloxane segments and at least two terminal and/or lateral isocyanate-reactive groups and having molecular weights of 194 to about 20,000, preferably about 300 to 3000. Difunctional polysiloxanes containing organofunctional terminal groups are preferably used. These compounds contain structural units having the formula $-O-Si-(R)_2-$ where R is a $C_1-C_4$ alkyl radical or a phenyl radical, but preferably a methyl radical.

Organofunctional, linear polysiloxanes suitable for use as starting material in accordance with the invention are described, for example, in DE-AS Nos. 1,114,632, 1,190,176, 1,248,287, 2,543,638 and in DE-OS Nos. 2,356,692, 2,445,648, 2,363,452, 2,427,273 or 2,558,523. The organofunctional terminal groups are preferably aliphatic hydrocarbon radicals optionally containing a hydroxyl, carboxyl, mercapto or primary or secondary amino group or carboxylate acid hydrazide groups and, optionally, heteroatoms, in particular oxygen. Preferred carbofunctional groups include primary and secondary hydroxyl groups and also secondary amino groups. Starting compounds terminated by primary hydroxyl groups are particularly preferred. The organofunctional groups may be present in the starting materials, for example, in the form of the following carbofunctional radicals:

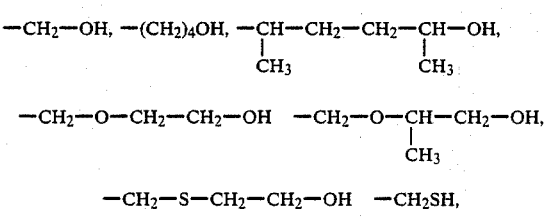

-continued
—CH₂—S—CH₂—CH₂—SH, —CH₂—CH₂—COOH,

—CH₂—NH₂, —(CH₂)₄NH₂, —CH₂—NH—C₄H₉ or

—CH₂—NH—C₆H₁₁.

The organofunctional polysiloxanes contain at least 1 and preferably about 3 to 30 structural units corresponding to the formula —O—Si(R)₂— (R is preferably methyl) for a molecular weight of 194 to about 20,000 and preferably about 300 to 3000.

According to the invention, particularly preferred starting compounds are hydroxymethyl polydimethyl siloxanes corresponding to the following general formula

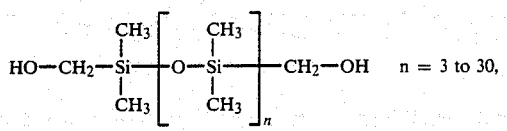

which may be obtained in a known manner, for example by the process according to DE-AS No. 1,236,505.

(3b) According to the invention, difunctional or higher, preferably difunctional, hydroxy-functional polyethers which have less than about 10% by weight consist of oxyethylene segments —CH₂—CH₂—O—, molecular weights of 226 to about 3000, preferably about 300 to 2000, and are obtained by alkoxylation of aromatic compounds containing at least two phenolic hydroxyl groups, may also be used in component (A). Compounds containing at least two phenolic hydroxyl groups which are suitable for use in the production of the aromatic polyethers used in accordance with the invention include hydroquinone and isomeric naphthalene diols, but are preferably diols corresponding to the following general formula

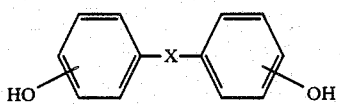

in which X represents one of the difunctional radicals —S—, —O—, —SO₂—, —CO— or —C(R₁R₂)—, wherein R₁ and R₂ may be the same or different and represent hydrogen or C₁-C₄ alkyl radicals or are closed to form an aliphatic ring containing 5 or 6 carbon atoms. Diols in which X represents —C(R)₂— are particularly preferred, while those in which X represents —C(CH₃)₂— are most particularly preferred.

The aromatic hydroxypolyethers suitable for use in accordance with the invention are produced in a known manner by polyaddition of cyclic ethers onto the aromatic polyols mentioned above. Suitable cyclic ethers include ethylene oxide, propylene oxide, butylene oxide, styrene oxide or mixtures of these compounds. When ethylene oxide is used, these compounds should only be used in such quantities that the resulting aromatic polyethers contain less than about 10% by weight of oxyethylene segments —CH₂—CH₂—O—, as stipulated above. Propylene oxide is preferably exclusively used.

Particularly preferred aromatic hydroxyl polyethers are adducts of bisphenol A and propylene oxide.

According to the invention, the hydrophobic polyurethanes (A) may also contain polyesters containing aromatic molecule segments, for example (3c) Polyesters of isomeric phthalic acids containing at least two terminal and/or lateral hydroxyl groups and having molecular weights of about 250 to 5000 and preferably about 250 to 2000. Difunctional polyesters of this type are preferably used. The polyesters in question are condensates known per se of polyhydric, preferably dihydric alcohols, with phthalic acid, isophthalic acid and/or terephthalic acid, these aromatic acids optionally being substituted, for example by halogen atoms. Instead of using the free dicarboxylic acids, the corresponding carboxylic acid esters of lower alcohols or—in the case of phthalic acid—also its anhydride may be used for producing the aromatic polyesters suitable for use in accordance with the invention.

According to the invention, (3d) compounds containing perfluoroalkyl groups and at least two terminal and/or lateral isocyanate-reactive groups and having molecular weights of about 250 to 5000 and preferably about 300 to 2000 may also be used in (A). It is preferred to use diols of the type mentioned which contain at least three perfluorinated carbon atoms in the form of perfluoroalkyl groups incorporated in the main chain of the diol and/or arranged laterally thereto. "Perfluoroalkyl groups" are understood to be saturated, perfluorinated aliphatic radicals which may have a linear, branched or even cyclic structure. It is particularly preferred to use diols of the above-mentioned type containing lateral perfluoroalkyl groups, of the type described, for example in DE-OS No. 3,319,368. Examples of particularly suitable synthesis components of this type are the N-sulfonyl perfluoroalkyl aminoalkanol derivatives corresponding to the following general formula:

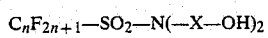

$C_nF_{2n+1}—SO_2—N(—X—OH)_2$ in which
X is a linear or branched saturated alkylene radical containing from 2 to 4 carbon atoms and
n is an integer greater than 2 and preferably from 5 to 12.

(4) Chain-extending agents such as polyhydroxyl, polyamino and/or hydroxyamino compounds having molecular weights of up to 399 may also be used.

More specifically, the compounds in question include
(4a) low molecular weight, monomeric and/or oligomeric polyhydroxy compounds. The monomeric polyols preferably have molecular weights of 62 to 399 and comprise such compounds as ethane diol, 1,2- and 1,3-propane diol, 1,4-, 2,3- and 1,3-butane diol, neopentyl glycol, 1,6-hexane diol, 1,4,3,6-dianhydrohexitols, trimethylol propane, glycerol and pentaerythritol. Examples of oligomeric chain-extenders are on average difunctional condensates of the above-mentioned trifunctional or tetrafunctional alcohols and monofunctional carboxylic acids having average molecular weights of from 200 to 399. Suitable carboxylic acids are the saturated and/or unsaturated fatty acids mentioned in the foregoing as suitable synthesis components for the relatively high molecular weight hydroxyl polyesters.

(4b) Also included are polyamines, hydrazine and/or hydrazine derivatives having molecular weights of 32 and 60 to 399, preferably 32 and 60 to about 300. The polyamines are preferably aliphatic or cycloaliphatic diamines, although trifunctional or higher polyamines may also be used to obtain a certain degree of branching. Examples of suitable aliphatic polyamines are ethylene diamine, 1,3-propylene diamine, tetramethylene diamine, hexamethylene diamine, 1,2-propylene diamine, the isomeric mixture of 2,2,4- and 2,4,4-trimethylhexamethylene diamine and bis-(2-aminoethyl)amine (diethylene triamine).

Examples of suitable cycloaliphatic polyamines which may be used either as individual stereoisomers or as mixtures of stereoisomers include:

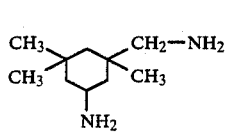 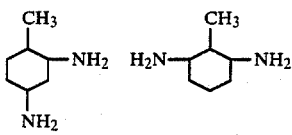

(isophorone diamine)

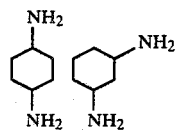 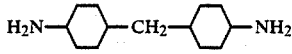

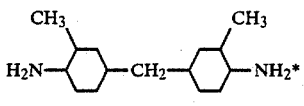

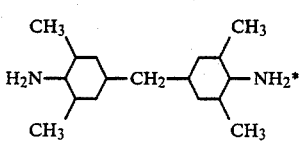

*the methyl groups may also be straight-chain or branched-chain $C_2$–$C_4$ alkyl groups,

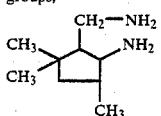 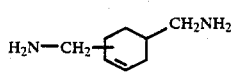

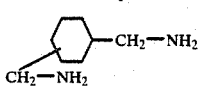

Araliphatic polyamines, such as for example m- and p-xylylene diamine and also m- or p-$\alpha,\alpha,\alpha',\alpha'$-tetramethylxylylene diamine, may also be used as chain-extending agents for the polyurethane ureas according to the invention.

Examples of suitable hydrazinic chain-extending agents are hydrazine, which should preferably be used in the form of its hydrate, and hydrazine derivatives containing at least two free hydrazinic amino groups, such as for example carbodihydrazide, adipic acid dihydrazide, terephthalic acid dihydrazide or β-semicarbazidopropionic acid hydrazide.

(5) Monofunctional chain terminators which may be incorporated include oximes such as alkanone or cycloalkanone oximes; monohydric alcohols such as n- or iso-butanol or stearyl alcohol; monofunctional, primary or secondary monoamines such as butylamine, di-n-butylamine or stearylamine; and hydrazine derivatives such as N,N-dimethylhydrazine, acethydrazide, stearic acid semicarbazide or the like. Stabilizers which may be incorporated include N,N-dimethyl-N'-hydroxyethylhydrazine, 4-amino-2,2,6,6-tetramethylpiperidine, bis-N,N-(3'-aminopropyl)-4-amino-1,2,2,6,6-pentamethylpiperidine or 4-(2'-hydroxyethyl)-2,5-di-tert.-butylhydroquinone.

Compounds which may also be used include crosslinking agents, lubricants, antiblocking agents and dyeability promoters such as N,N-bis-(2'-hydroxyethyl)-stearlyamine and diols containing tertiary amino groups such as N,N-bis-(2'-hydroxypropyl)-N-methylamine.

The polyurethanes or polyurethane ureas (A) are preferably prepared by initially preparing NCO-prepolymers containing at least two terminal isocyanate groups from the polyisocyanates described under (1), the relatively high molecular weight polyhydroxyl compounds described under (2) and silicone resins, aromatic polyethers, aromatic polyesters and/or perfluorocarbon resins containing isocyanate-reactive groups of the type described under (3) and reacting the NCO-prepolymers thus obtained in known manner with the chain-extending agents described under (4). The chain-extending reaction is preferably carried out in organic solution, the organic solvents being selected from the group of solvents mentioned hereinafter under (C). It is equally possible and, in many cases, even advantageous to use mixtures of solvents and non-solvents for the polyurethanes or polyurethane ureas (A) as the reaction medium in the chain-extending reaction, provided that the polyurethanes or polyurethane ureas (A) dissolve, at least in colloidal form, in these mixtures. In this case the solvents are selected from the group of solvents described hereinafter under (C) and the non-solvents from the group of non-solvents described hereinafter under (D).

When the chain-extending reaction is carried out in organic solution, the solution generally has a solids content of about 10 to 50% by weight and preferably about 20 to 40% by weight. The viscosities of the chain-extended polyurethane urea solutions, as measured at room temperature, are adjusted to between about 10,000 and 100,000, preferably between about 20,000 and 60,000 mPas at 25° C. To guarantee good viscosity stability, it is advisable to add monofunctional chain terminators (5), such as the oximes described in DE-OS No. 3,142,706, in the small quantities required after the desired solution viscosity has been reached.

In principle, it is also possible to prepare the polyurethanes or polyurethane ureas (A) in a known manner in the melting using suitable mixing units such as reaction screws, and to dissolve the solids obtained after cooling, for example in the form of granulates, in the above-mentioned solvents or solvent/non-solvent mixtures to prepare the spreading pastes according to the invention.

The type and quantity ratios of the starting materials used in the production of (A), are, moreover, selected such that the resulting polyurethanes or polyurethane ureas (A) contain about 1 to 30, preferably about 1 to 20% by weight of polymer segments of the type obtained by incorporating one or more of the synthesis components, previously described under (3a–d).

In a particularly preferred embodiment, component (A) is based on polyurethane ureas produced from (1) about 10 to 40% by weight, preferably about 15 to 35% by weight, of the aliphatic polyisocyanates described above under (1) and (2) at least about 40% by weight, preferably about 45 to 80% by weight, of the relatively high molecular weight polyhydroxyl compounds described above under (2) and (3a) 0 to about 15% by weight of the silicone resins described above under (3a), (3b) 0 to about 15% by weight of the aromatic polyethers described above under (3b), (3c) 0 to about 15% by weight of the aromatic polyesters described above under (3c), and/or (3d) 0 to about 15% by weight of the perfluorocarbon resins described above under (3d), such that the percentages of synthesis components (3a) to (3d) are present in an amount of about 1 to 20% by weight, (4a) 0 to about 20% by weight of the low molecular weight polyhydroxyl compounds having a molecular weight of 62 to 399 described above under (4a) and/or (4b) about 2 to 20% by weight, preferably about 3 to 20% by weight of the polyamines and/or hydrazines described above under (4b) and (5) 0 to about 5% by weight of other PU synthesis components such as chain terminators, crosslinkers or stabilizers.

In addition to component (A), component (B) may optionally be used as a second polyurethane urea in the formulation of the spreading pastes according to the invention. Component (B) is based on hydrophobic polyurethanes or polyurethane ureas synthesized in exactly the same was as (A), except that they do not contain the special polymer segments (3a) to (3d). Accordingly, component (B) may be produced from the same range of starting materials as described above in reference to the production of component (A), except for the special synthesis components mentioned under (3a) to (3d).

The organic solvents (C) suitable for use in accordance with the invention are organic compounds, preferably boiling at temperatures of about 50° to 150° C., with which stable solutions of the polyurethanes or polyurethane ureas (A) and (B) may be prepared. In this context, the term "solutions" comprises not only genuine, optically clear polymer solutions, but also non-sedimenting organic solution systems containing colloid or microgel components. Suitable solvents include tetrahydrofuran, diisopropylether, dioxane, glycol momomethylether, but perferably alcohols and ketones containing from 4 to 6 carbon atoms, more preferably isobutanol and/or methylethylketone.

The organic non-solvents (D) suitable for use in accordance with the invention are organic compounds, preferably boiling at temperatures of about 50° to 150° C., with stable solutions of the polyurethanes or polyurethane ureas (A) and (B) cannot be prepared unless further auxiliaries are added. These non-solvents are preferably aromatic and/or aliphatic hydrocarbons containing from 6 to 12 carbon atoms and/or fatty acid esters containing from 3 to 7 carbon atoms. Particularly preferred non-solvents are toluene, isomeric xylenes and/or the commercial mixtures of relatively high boiling hydrocarbons known as "solvent naphtha."

The polymers (E) optionally used in combination with the components mentioned thus far in the production of the spreading pastes according to the invention are non-polyurethanes, i.e. polymers which do not contain any urethane or urea groups, but instead contain lateral and/or terminal carboxylate groups completely or partly neutralized with bases. Preferred starting materials of this type are homo- or copolymeric polyacrylic and/or polymethacrylic acids and/or cellulose derivatives containing carboxyl groups such as carboxymethyl cellulose. It is particularly preferred to use completely or partly neutralized poly(meth)acrylic acids or (meth)acrylic acid copolymers. The resins in question are obtained by the polymerization of acrylic acid and/or methacrylic acid as such or with other vinyl or vinylidene monomers such as styrene, styrene derivatives, (meth)acrylates containing from 1 to 8 carbon atoms in the alcohol component, for example $\Omega$-hydroxyalkylesters of (meth)acrylic acid and/or acrylonitrile. The (meth)acrylic component of the (co)polymer makes up about 1 to 100% by weight and preferably about 2.5 to 60% by weight. These polyacrylic resins generally have average molecular weights of more than about 100,000 and beyond into the microgel range.

Any organic or inorganic bases may be used for neutralizing the carboxyl groups. Preferred bases are ammonia; organic amines such as triethylamine, tributylamine, N,N-dimethylbenzylamine or N-methylmorpholine; and organic amino alcohols such as ethanolamine, N,N-dimethylethanolamine, diethanolamine, N-methyldiethanolamine or triethanolamine.

The polymers (E) suitable for use in accordance with the invention may advantageously be used in the form of aqueous solutions or dispersions so that the water (F) required for preparing the spreading pastes according to the invention is directly introduced. However, it is also possible to introduce only some of the water (F) with the polymer (E) and subsequently to add the rest. If polymer (E) is used as a solid or in the form of an organic solution, which is less preferred, the total quantity of water (F) must of course be subsequently added.

In addition to the principal components (A) to (F), the spreading pastes according to the invention may optionally contain standard coating auxiliaries (G) such as crosslinking agents and/or hydrophobicizing agents. Suitable crosslinking agents, which may be used in particular for improving the fastness of the coatings produced from the spreading pastes to cleaning processes, include melamine-formaldehyde resins, blocked or free polyisocyanates, polyaziridines, epoxy resins and/or epoxy resin-polyamine combinations or mixture of these crosslinking agents. Suitable hydrophobicizing agents include standard commercial silicones and/or fluorocarbon resins. The usual catalysts required for rapid crosslinking of the resins may also be included.

The spreading pastes according to the invention contain the components described above in the quantities specified, but preferably in the following quantities: about 5 to 30% by weight of (A), 0% by weight of (B), at least about 5% by weight, preferably about 5 to 40% by weight and most preferably about 5 to 30% by weight of (C), about 4.5 to 40% by weight of (D), about 0.5 to 5% by weight of (E), about 20 to 60% by weight of (F) and 0 to about 5% by weight of (G).

The spreading pastes are prepared by mixing an organic hydrophobic polyurethane phase with an aqueous phase to form a stable, multi-phase emulsion-like mixture. As described above, the organic phase preferably contains the polyurethane ureas (A) and optionally (B), the organic solvents (C), optionally the organic non-solvents (D) and optionally the coating auxiliaries (G). The polymer (E) containing carboxylate groups is preferably contained in all or part of the water (F). It follows from this that the spreading pastes may be produced both by a single-stage process and also by a multistage process. In the multistage process for example, the organic polyurethane phase is initially mixed with a solution or dispersion of the carboxylate polymer (E) in part of the water (F) and the rest of the water (F) is added to the resulting mixture. Similarly, partial quantities of the organic solvents (C) or organic non-solvents (D) may be subsequently added to the mixture already containing water.

Mixing of the organic and aqueous phases to prepare the spreading pastes according to the invention may be carried out in stirring units of the type normally used in the coating field such as dissolvers or dispersers. Accordingly, the spreading pastes may be prepared without difficulty from the organic and aqueous starting products described above by the user of these coating systems. The ready-to-use pastes are distinguished by high homogeneity and good stability in storage and may therefore be safely processed.

If necessary, the spreading pastes may even be applied in pigment form. In that case, it is preferred to pigment the spreading pastes themselves, although it is also possible to pigment the starting products such as the organic polyurethane solutions. Organic or inorganic pigment and powders of the type normally used in the coating of fabrics and also soluble dyes may be used for this purpose.

The carry out the process according to the invention, the spreading pastes described in the foregoing are either directly knife-coated onto fabric or leather substrates by standard fabric-coating techniques or are processed by the transfer process, i.e. by initially coating onto release paper. The coatings are then exposed to temperatures of about 40° to 120° C., preferably about 50° to 80° C., in the drying tunnel of a fabric coating machine, the temperature optionally being increased in successive stages. Coagulation occurs through selective evaporation of the solvents.

In the direct coating process, two coats are generally applied. After the first coat (undercoat) has dried, a topcoat is applied by knife-coating as a second coat and dried under the conditions described above. The spreading pastes according to the invention as described in the foregoing are used as the topcoat. Their base polyurethanes may be identical with or different from those of the undercoat pastes.

In its most simple form, the transfer (or reverse-coating) process comprises applying the topcoat to release paper, knife-coating a coupling layer onto the dried topcoat, laminating the fabric substrate onto the coupling layer and then drying and removing the release paper. The coupling layer may consist either of the spreading pastes according to the invention as described in the foregoing or also conventional dispersion- or solution-type coupling products optionally foamed either mechanically or by means of blowing agents.

In principle, it is also possible by the process according to the invention to produce coatings having three or more layers wherein the surface layer may optionally be a compact, non-coagulated layer of low weight, i.e. about 3 to 15 g/m$^3$, preferably about 4 to 6 g/m$^3$.

The coagulation or drying times per layer are about 1 to 3 minutes, enabling the coating machines used to operate at comparatively high speeds in relation to other evaporation coagulation processes. If thermosetting crosslinking agents are added to the spreading pastes, the drying process may be followed by crosslinking at temperatures of about 120° to 200° C., preferably about 140° to 160° C.

The coatings obtained by the process described in the foregoing are highly permeable to water vapor, highly waterproof and show outstanding resistance to aging and cleaning processes. The correspondingly coated fabrics or leather are suitable, for example, for the production of high quality sports clothing and rainwear, sports and leisure goods and shoe materials.

The invention is further illustrated, but is not intended to be limited by the following examples in which all parts and percentages are by weight unless otherwise specified.

The coating tests cited in the Examples were carried out by the following methods:

resistance to water, DIN 53 886, measured in mm water column (mm WC)

permeability to water vapor, IUP 15 (DIN 53 333), measured in mg/cm$^3$.h

Scrubb test, SNV 198 498 (SNV = Swiss Standards Association).

EXAMPLES

Example 1

(I) Preparation of a polyurethane urea solution 2193 g of a polyester of diethylene glycol and adipic acid (OH number 44) and 79 g of a $\alpha,\omega$-bis-hydroxymethylpolydimethylsiloxane (OH number 200) were dehydrated and then reacted with 710 g of isophorone diisocyanate. An NCO-value of 5.9% (theoretical 6.2%) was reached after a reaction time of 2 hours at 90°–100° C. The prepolymer thus obtained was diluted with 2916 g of toluene and cooled to 25° C. A solution of 374 g of isophorone diamine in 3916 g of isobutanol was added dropwise to the resulting solution with thorough stirring. When a viscosity of 30,000–40,000 mPas had been reached, the chain-extending reaction was stopped by the addition of 40 g of butanone oxime. After stirring for 2 hours at 50° C., a polyurethane urea solution having a viscosity (at 25° C.) of approx. 40,000 mPas was obtained. Polyurethane (A) contained components 1–5 in percentages by weight (based on PU solids) of 20.9, 64.6, 2.3, 11.0 and 1.2, respectively.

(II) Preparation of the undercoat paste 815 g of the solution described in (1/I) were diluted with 160 g of toluene. 13 g of a 75% solution of a blocked polyisocyanate having a blocked NCO-content of approx. 10% (described in DE-OS No. 3,313,236, Example 4) and 12 g of a 50% aqueous melamine resin solution (hexamethoxymethylmelamine) were then added, resulting in the formation of a homogeneous, stable solution having a viscosity (at 25° C.) of approx. 10,000 mPas.

100 g of the aqueous dispersion of a neutralized polyacrylic acid described hereinafter was then stirred into this organic solution. Finally, 750 g of water were added with vigorous stirring. A white two-phase spreading paste having a solids content of approx. 15% and a viscosity (at 25° C.) of approx. 12,000 mPas was obtained.

This paste contained components (A) to (G) in the following percentages by weight: A:B:C:D:E:F:G = 13.2/0/15.4/24.1/1.0/44.9/1.4.

Preparation of the neutralized polyacrylic acid dispersion:

250 g of a 25% aqueous dispersion of a copolymer of 55% of ethylacrylate and 45% of methacrylic acid were diluted with 625 g of water and neutralized with 125 g of triethanolamine. Approx. 40% of the neutralized copolymer consisted of a water-soluble component having an average molecular weight of 250,000 and approx. 60% of a relatively high molecular weight microgel component.

(III) Preparation of the topcoat paste 810 g of the solution described in 1/I) were diluted with 165 g of toluene. 20 g of the 50% aqueous melamine resin solution described in (1/II) and 5 g of a 40% solution of a fluorocarbon resin (Scotchgard FC-326, a product of 3M) were then added, resulting in the formation of a homogeneous, stable solution having a viscosity (at 25° C.) of approx. 10,000 mPas.

100 g of the neutralized aqueous polyacrylic acid dispersion described in (1/II) were stirred into this solution and, finally 750 g of water were added with vigorous stirring. A white two-phase spreading paste having a solids content of approx. 15% and a viscosity of approx. 10,000 mPas was obtained. This paste contained components (A) to (G) in the following percentages by weight: A:B:C:D:E:F:G=13.1/0/15.3/24.3/1.0/44.9/1.4.

(IV) Direct coating (a) Substrate polyamide:

An approx. 100 g/m$^3$ polyamide fabric was coated with the undercoat paste (1/II) using an air knife. The working conditions were as follows:

Drying temperature: 70° C./80° C./80° C.
Rate of travel: 6 m/min
Coating weight (dry): 5 g/m$^3$.

Using the topcoat paste (1/III), the topcoat was applied in the second spreading unit consisting of doctor rolls:

Roll gap: 0.23 mm
Drying temperature: 70° C./70° C./70° C.
Subsequent crosslinking at: 140°-160° C.
Coating weight (dry): 20 g/m$^3$.

For a total coating weight of 25 g/m$^3$, the article was distinguished by high resistance to water and high permeability to water vapor.

Resistance to water:
 original: 1200-1300 mm WC
 30° C. wash 1×: 950-1050 mm WC
 30° C. wash 3×: 800-900 mm WC
 dry cleaning 1×: 850-900 mm WC
 dry cleaning 3×: 600-700 mm WC
Permeability to water vapor: 7 mg/cm$^3$.h
Scrubb test, 1000 strokes, wet: no damage.

(b) Substrate cotton:

An approx. 140 g/m$^3$ cotton fabric was hydrophobicized by standard methods (with PERLIT SE (20 g/l) and PERLIT SI/SW (20 g/l), products of Bayer AG, D-5090 Leverkusen) and, after squeezing out, was coated while moist with the undercoat paste (1/II) using an air knife.

Drying temperature: 70° C./80° C./100° C.
Rate of travel: 6 m/min.
Coating weight dry: 7 g/m$^3$.

The topcoat paste (1/III) was applied in the second spreading unit consisting of doctor rolls:

Roll gap: 0.35 mm
Drying temperature: 70° C./70° C./70° C.
Subsequent crosslinking at: 140°-160° C.
Coating weight (dry): 28 g/m$^3$.

Resistance to water:
 original: 1400-1500 mm WC
 30° C. wash 1×: 1000-1100 mm WC
 30° C. wash 3×: 800-900 mm WC
 dry cleaning 1×: 950-1050 mm WC
 dry cleaning 3×: 650-750 mm WC
Permeability to water vapor: 10 mg/cm$^3$.h Scrubb test, 1000 strokes, wet: no damage.

(c) Substrate cotton/polyester or polyamide blend:

After hydrophobicizing in accordance with (b), blended fabrics of cotton and polyester or polyamide (weighing approx. 130 g/m$^3$) were coated while moist with the undercoat paste (1/II) in the same way as described in (b). The topcoat paste (1/III) was then applied in the second spreading unit, again as described in (b).

| Total coating weight | Polyamide/cotton 28 g/m$^3$ | Polyester/cotton 28 g/m$^3$ |
|---|---|---|
| Resistance to water | | |
| original | 1200 | 1500 mm WC |
| 30° C. wash 1 × | 900 | 1000 mm WC |
| 30° C. wash 3 × | 750 | 850 mm WC |
| dry cleaning 1 × | 750 | 900 mm WC |
| dry cleaning 3 × | 600 | 700 mm WC |
| Permeability to water vapor | 7 | 9 mm/cm$^3$ · h |
| Scrubb test, 1000 strokes wet: | no damage | no damage |

(V) Transfer coating (a) Spreading paste for the topcoat permeable to water vapor:

100 g of the water-containing topcoat paste described in (1/III) were pigmented with 25 g of ACRAMIN-brown FRL (a product of Bayer AG, D-5090 Leverkusen).

(b) Spreading paste for a thin intermediate coat (state-of-the-art):

1000 g of the polyurethane urea solution described in (1/I) were diluted with 150 g of the toluene and 150 g of isobutanol and pigmented with 40 g of ACRAMIN-brown FRL.

(c) Spreading paste for a coupling layer permeable to water vapor:

1000 g of the water-containing undercoats described in (1/II) were pigmented with 25 g of ACRAMIN-brown FRL.

(d) Dispersion of mechanically-formed foam for a foamed coupling layer (state-of-the-art):

A mixture of 500 g of the aqueous polyurethane dispersion described hereinafter and 500 g of the aqueous polyacrylate dispersion described hereinafter, 6 g of a 50% aqueous ammonium stearate solution, 10 g of the 25% aqueous polyacrylic acid dispersion described in (1/II) and 20 g of a 50% aqueous melamine resin solution (hexamethoxymethylmelamine) were adjusted to pH 9 with concentrated aqueous ammonia solution and mechanically-formed with a high-speed stirrer (500 g/l).

Composition of the polyurethane dispersion:

82.4% of a polyester of 1,6-hexane diol, neopentyl glycol and adipic acid (OH number 66; ratio by weight of hexane diol to neopentyl glycol=65:35), 14.6% of hexamethylene diisocyanate, 2.4% of the sodium salt of 2-aminoethyl-2-aminoethane sulfonic acid and 0.6% of ethylene diamine; solids content 40% dispersed in water.

Composition of the polyacrylate dispersion:

96% of butylacrylate, 1% of itaconic acid, 2.5% of acrylamide and 0.5% of N-methylol acrylamide; solids content 40% dispersed in water.

(e) Article of two coats:

Spreading paste (a) a knife-coated onto a commercial release paper in the first spreading unit a tandem coating machine:
Roll gap: 0.18 mm
Drying temperature: 70° C./70° C./70° C.
Residence time in the drying tunnel: 2.5 minutes
Coating weight (dry): 15 g/m$^3$.

Paste (c) was applied in the second coating unit (roll gap 0.25 mm), after which a teased cotton fabric weighing approx. 140 g/m$^3$ was applied.
Drying temperature: 60° C./70° C./90° C.
Subsequent crosslinking at: 150°–160° C.

A soft, supple article having a total coating weight of approx. 35 g/m$^3$ and a permeability to water vapor of 9 mg/cm$^3$.h was obtained which is suitable for the production of lightweight outer clothing.

(f) Article of two coats:

The dispersion beating foam paste (d) was applied to the dried topcoat described in (e) in the second spreading unit (roll gap 0.3 mm). The cotton substrate described in (e) was then applied. The coupling layer was dried successively at 80° C./120° C./160° C. A soft, full article having a total coating weight of approx. 60 g/m$^3$ and a permeability to water vapor of 10 mg/cm$^3$ was obtained.

(g) Article of three coats:

The spreading paste (b) was knife-coated onto a commercial release paper in the first spreading unit of the three-coat machine and a thin, compact pre-topcoat (weight 6 g/m$^3$) was produced by drying at 60° to 120° C.

Using paste (a), the topcoat permeable to water vapor was applied by knife coating in the second spreading unit. Working conditions same as described in (e); coating weight (dry): 15 g/m$^3$.

The dispersion of mechanically-formed foam paste (d) was applied as coupling layer in the first spreading unit (roll gap 0.3 mm). The cotton substrate described in (e) was then applied. The coupling layer was dried successively at 80° C./120° C./160° C. A soft, very full article having a total coating weight of approx. 65 g/m$^3$ and a permeability to water vapor of 7 mg/cm$^3$.h was obtained.

Example 2

(I) Undercoat: polyurethane urea solution and spreading paste thereof 2193 g of a polyester of diethylene glycol and adipic acid (OH number 44) and 79 g of a $\alpha,\omega$-bis-hydroxymethylpolydimethylsiloxane (OH number 200) was reacted with 577 g of isophorone diisocyanate as described in Example (1/I); NCO-content; 4.5%.

The prepolymer thus obtained was diluted by the addition of 2420 g of toluene and cooled to 20° C. The solution was further diluted with 1470 g of isobutanol prior to chain extension.

Chain extension: a separately prepared solution of 272 g of IPDA in a mixture of 1224 g of toluene and 1224 g of isobutanol was quickly added to the cooled prepolymer solution with thorough stirring. 950 g of isobutanol were then gradually added with increasing viscosity. After a viscosity of 30,000 to 40,000 mPas had been reached, chain extension was stopped by the addition of 30 g of butanone oxime.

After stirring for 1 hour at 50° C., a clear solution having a viscosity (at 25° C.) of 40,000 mPas was obtained.

815 g of the polyurethane urea solution described above were diluted with 165 g of toluene. 15 g of the blocked polyisocyanate described in Example (1/II) and 5 g of an epoxy resin (LEKUTHERM X 50, a product of Bayer AG) were then added to this dilute solution. In addition, 100 g of the neutralized aqueous polyacrylic acid dispersion described in (1/II) were stirred in and 750 g of water subsequently dispersed therein. The spreading paste had a solids content of approx. 15% and a viscosity (at 25° C.) of 10,000 mPas.

(II) Topcoat: polyurethane urea solution and spreading paste thereof 1913 g of a polyester of 1,4-butane diol and adipic acid (OH number 50) and 85 g of a $\alpha,\omega$-bis-hydroxymethylpolydimethylsiloxane (OH number 200) were reacted with 644 g of isophorone diisocyanate and 323 g is isophorone diamine in a reaction screw at temperatures of from 80° to 180° C. The extruded melt strand was granulated after cooling. 300 g of the polyurethane urea granulate were dissolved in 350 g of toluene and 350 g of isobutanol; the 30% solution had a viscosity (at 25° C.) of 30,000 mPas.

810 g of this solution were diluted with 165 g of toluene. 20 g of a 50% aqueous melamine resin according to Example (1/II) and 5 g of a silicone resin (SILOPREN E 50, a product of Bayer AG), were then added to this solution. 100 g of the neutralized aqueous polyacrylic acid dispersion described in (1/II) and 750 g of water were then mixed in. The approx. 15% spreading paste had a viscosity of approx. 15,000 mPas.

(III) Direct coating

An approx. 90 g/m$^3$ polyamide fabric was coated with the undercoat paste (2/I) using an air knife. The working conditions in a 15 m long drying tunnel were as follows:
Drying temperature: 70° C./80° C./100° C./150° C.
Rate of travel: 8 m/min.
Coating weight (dry): 5 g/m$^3$.

The topcoat paste (2/II) was applied by doctor rolls in the second spreading unit:
Drying temperature: 70° C. throughout the tunnel
Roll gap: 0.30 mm
Coating weight (dry): 27 g/m$^3$.

After crosslinking (1 min/160° C.), the article was hydrophobicized in the same way as described in Example (1/IVb).
Resistance to water:
original: 1500 mm WC
30° C. wash 1×: 1000 mm WC
30° C. wash 3×: 900 mm WC
dry cleaning 1×: 800 mm WC
dry cleaning 3×: 700 mm WC
Permeability to water vapor: 5 mg/cm$^3$.h
Scrubb test, 1000 strokes, wet: no damage.

Example 3

(I) Undercoat 1913 g of a polyester of diethylene glycol and adipic acid (OH number 44) and 138 g of a polyether of bisphenol A and propylene oxide (OH number 205) were reacted after dehydration with 348 g of tolylene-2,4-/2,6 (65:35)-diisocyanate. An NCO value of 3.5% was reached after a reaction time of 1 hour at 100° C. The NCO prepolymer was dissolved in 2997 g of toluene and diluted with 1997 g of isobutanol prior to chain extension. A solution of 170 g of isophorone diamine in 1000 g of isobutanol was then added dropwise at 25° C. After a viscosity of 50,000 mPas had been reached, the addition reaction was terminated by the addition of 20 g of butanone oxime. The solution had a solids content of 30%.

815 of the polyurethane urea solution described above were diluted with 165 g of toluene. 15 g of the polyisocyanate described in Example (1/II) and 5 g of a polyaziridine of the type described, for example, in U.S. Pat. No. 3,415,920 were then added to this dilute solution. In addition, 100 g of the neutralized, aqueous polyacrylic acid dispersion described below were stirred in and 750 g of water subsequently dispersed therein. A white, two-phase spreading paste having a solids content of approx. 15% and a viscosity (at 25° C.) of approx. 15,000 mPas was obtained. Preparation of the polyacrylate dispersion:

250 g of the 25% polyacrylic acid dispersion described in (1/II) were diluted with 662 g of water and neutralized with 88 g of N-methyl morpholine.

(II) Topcoat 2040 g of a polyester of diethylene glycol and adipic acid (OH number 44) and 110 g of a polyether of bisphenol A and propylene oxide (OH number 205) were reacted with 666 g of isophorone diisocyanate at 100°–110° C. An NCO-value of 5.9 was reached after a reaction time of 2 hours.

The prepolymer was dissolved in 3722 g of toluene and 1000 g of isobutanol and then chain-extended at 25° C. with a solution of 375 g of isophorone diamine in 2722 g of isobutanol. After a viscosity of 40,000 mPas had been reached, the polyaddition reaction was stopped by the addition of 20 g of butanone oxime. the solution had a solids content of 30%.

810 g of the 30% solution were diluted with 160 g of ethylacetate. 25 g of the 50%, aqueous melamine resin and 5 g of a silicone resin (BAYSILON OF/OH 502, Bayer AG), were then added to this solution. In addition, 100 g of the neutralized, aqueous polyacrylic acid dispersion described in (3/I) were stirred in and 750 g of water subsequently dispersed therein. The two-phase spreading paste had a solids content of approx. 15% and a viscosity (at 25° C.) of 10,000 mPas.

(III) Direct coating

An 80 g/m³ polyester fabric was coated with the undercoat paste (3/I) using an air knife and with the topcoat paste (3/II) using doctor rolls as in (2/III).
Total coating weight: 25 g/m³
Resistance to water:
  original: 1100 mm WC
  30° C. wash 1×: 900 mm WC
  30° C. wash 3×: 800 mm WC
  dry cleaning 1×: 700 mm WC
  dry cleaning 3×: 600 mm WC
Permeability to water vapor: 5 mg/cm³.h
Scrubb test, 1000 strokes, wet: no damage.

Example 4

(I) Undercoat

Spreading paste according to the Example (2/I).

(II) Topcoat 1913 g of a polyester of diethylene glycol and adipic acid (OH number 44) and 102 g of a polyester of ethylene glycol and phthalic acid (OH number 275) were reacted with 666 g of isophorone diisocyanate at 100°–110° C. An NCO-value of 6.0 was reached after a reaction time of 2 hours. The prepolymer melt was dissolved in 5063 g of toluene. A solution of 340 g of isophorone diamine in 4000 g of isobutanol was added dropwise at 25° C. for chain extension. To terminate the polyaddition reaction, 20 g of butanone oxime was added after a viscosity of 40,000 mPas had been reached. The solution had a solids content of 25%.

25 g of the melamine resin solution described in (1/II) and 10 g of the silicone resin described in (3/II) were stirred into 965 g of this solution. Before dispersion with 750 g of water, 100 g of the neutralized aqueous polyacrylic acid dispersion described in (3/I) were incorporated. The spreading paste had a viscosity (at 25° C.) of 12,000 mPas.

(III) Direct coating

As in Example (3/III), the paste (2/I) was applied as undercoat and the paste (4/II) was applied as topcoat to a polyester fabric.
Total coating weight: 30 g/m³
Resistance to water:
  original: 1200 mm WC
  30° C. wash 1×: 900 mm WC
  dry cleaning 1×: 700 mm WC
Permeability to water vapor: 4 mg/cm³.h
Scrubb test, 1000 strokes, wet: no damage.

Example 5

(I) Undercoat 1720 g of a polyester of 1,6-hexane diol, neopentyl glycol (glycol ratio=65:35) and adipic acid (OH number 56) and 79 g of an α,ω-bis-hydroxymethylpolydimethylsiloxane (OH number 200) were reacted with 555 g of isophorone diisocyanate as in (1/I) to form an NCO-prepolymer. NCO-value: 5.1%.

After the prepolymer was dissolved in 3050 g of toluene and 1050 g of isobutanol, the polyurethane urea was synthesized with a solution of 255 g of isophorone diamine in 2000 g of isobutanol. The polyaddition reaction was terminated by the addition of 20 g of butanone oxime. The 30% solution had a viscosity (at 25° C.) of 39,000 mPas.

815 g of this solution were diluted with 165 g of xylene. 20 g of the blocked polyisocyanate described in (1/II) were added to this dilute solution. 100 g of the neutralized polyacrylic acid dispersion described below and then 750 g of water were added to the solution thus obtained. The two-phase spreading paste had a viscosity (at 25° C.) of approx. 15,000 mPas. Preparation of the polyacrylate dispersion:

After dilution with 645 g of water, 250 g of the 25% polyacrylic acid dispersion described in (1/II) were neutralized with 105 g of N-methyldiethanolamine.

(II) Topcoat 1720 g of the polyester used in (5/I) and 79 g of the dimethylpolysiloxane used in (5/I) were reacted with 710 g of isophorone diisocyanate to form a NCO-prepolymer (NCO-value 7.1%). The prepolymer was dissolved in 3350 g of toluene and 1350 g of isobutanol and then reacted as in (5/I) with 375 g of isophorone diamine in 2000 g of isobutanol. The 20% solution had a viscosity (at 25° C.) of 42,000 mPas.

815 g of this solution were diluted with 165 g of butylacetate and thoroughly stirred with 20 g of the blocked polyisocyanate described in (1/II), 100 g of the neutralized polyacrylic acid dispersion described in (5/I) and 750 g of water. Viscosity of the spreading paste: approx. 15,000 mPas (at 25° C.).

(III) Direct coating

As in Example (3/I), the paste (5/I) was applied as undercoat and the paste (5/II) was applied as topcoat to a polyester fabric.
Total coating weight: 30 g/m$^3$
Resistance to water:
  original: 1500 mm WC
  30° C. wash 1×: 1200 mm WC
  dry cleaning 1×: 900 mm WC
Permeability to water vapor: 8 mg/cm$^3$.h
Scrubb test, 1000 strokes, wet: no damage.

Example 6

(I) Undercoat 1720 g of a polypropylene glycol polyether (OH number 56) and 79 g of a α,ω-bis-hydroxymethyl-polydimethylsiloxane (OH number 200) were reacted with 577 g of isophorone diisocyanate as in (1/I) to form an NCO-prepolymer (NCO-value 5.6%).

The NCO-prepolymer melt was dissolved in 3090 g of toluene, diluted at 20° C. with 1090 g of isobutanol and reacted with a solution of 272 g of isophorone diamine in 2000 g of isobutanol. The 30% solution had a viscosity (at 25° C.) of 42,000 mPas.

815 g of this solution were diluted with 165 g of toluene, after which 15 g of the blocked polyisocyanate described in (1/II), 10 g of the aqueous melamine resin solution described in (1/II), 100 g of the neutralized polyacrylic acid dispersion described in (1/II) and 750 g of water were added. The two-phase spreading paste had a viscosity (at 25° C.) of approx. 17,000 mPas.

(II) Topcoat 2376 g of the prepolymer melt described in (6/I) were dissolved in 3160 g of toluene and diluted at 25° C. with 1160 g of isobutanol. The prepolymer solution was reacted with a solution of 336 g of 4,4'-diaminodicyclohexylmethane in 2000 g of isobutanol while cooling at 25° C. to form the polyurethane urea. The 30% solution had a viscosity (at 25° 1 C.) of 42,000 mPas.

810 g of this solution were diluted with 165 g of toluene, after which 25 g of the aqueous melamine resin solution described in (1/II) and 5 g of the silicone resin described in (3/II) were added. 100 g of the aqueous, neutralized polyacrylic acid dispersion described in (3/I) and 750 g of water were than added. The approx. 15% spreading paste had a viscosity (at 25° C.) of approx. 11,000 mPas.

Coatings permeable to water vapor were obtained by applying undercoat paste (6/I) and topcoat paste (6/II) to fabrics of natural and synthetic fibers.
Permeability to water vapor: 4–8 mg/cm$^3$.h
Resistance to water: >1000 mm WC.

EXAMPLE 7

(I) Undercoat

As in (6/I), 1720 g of a polytetramethylene glycol polyether (OH number 56) instead of the polypropylene glycol ether used therein were reacted with the other components mentioned therein. The 30% polyurethane urea solution had a viscosity (25° C.) of approx. 35,000 mPas. The undercoat paste prepared therefrom as in (6/I) had a solids content of approx. 15% and a viscosity (at 25° C.) of 15,000 mPas.

(II) Topcoat 1440 g of a polytetramethylene glycol polyether (OH number 56) and 158 g of a α,ω-bis-hydroxymethyl-polydimethylsiloxane (OH number 200) were reacted with 710 g of isophorone diisocyanate as in (1/I) to form an NCO-prepolymer (NCO-value: 7.8%). The prepolymer melt was dissolved in 3120 g of toluene, diluted at 25° C. with 1120 g of isobutanol and reacted while cooling with a solution of 375 g of isophorone diamine in 2000 g of amyl alcohol. The 30% polyurethane urea solution had a viscosity (at 25° C.) of approx. 42,000 mPas. The topcoat paste prepared therefrom as in (6/II) had a solids content of approx. 15% and a viscosity (at 25° C.) of 15,000 mPas.

Fabrics of natural and synthetic fibers were coated with the undercoat paste (7/I) and with the topcoat paste (7/II). The articles were distinguished by a soft feel, an almost non-blocking surface, good adhesion to the substrate, high permeability to water vapor and high resistance to water (>1200 mm WC).

EXAMPLE 8

(I) Undercoat

Spreading paste according to Example (2/I).

(II) Topcoat 2193 g of a polyether of diethylene glycol and adipic acid (OH number 44) and 79 g of a α,ω-bis-hydroxymethylpolydimethylsiloxane (OH number 200) were reacted with 760 g of 4,4'-diisocyanatodicyclohexylmethane in the melt at 110° C. An NCO-content of 5.0% was reached after a reaction time of 2 hours.

The melt was dissolved in 3900 g of toluene and diluted at 25° C. with 1900 g of n-butanol. A solution of 323 g of isophorone diamine in 2000 g of n-butanol was then run in while cooling. The 30% solution had a viscosity (at 25° C.) of 32,000 mPas. The topcoat paste prepared therefrom as in (6/II) had a solids content of 15% and a viscosity (at 25° C.) of 15,000 mPas.

(III) Direct coating

A 100 g/m$^3$ polyamine fabric was coated with the undercoat paste (2/I) using an air knife, after which the topcoat paste (8/II) was applied by doctor rolls (working conditions as in (2/III)).
Total coating weight: 35 g/m$^3$
Resistance to water:
  original: 1800 mm WC
  30° C. wash: 1500 mm WC
  dry cleaning: 1000 mm WC
Permeability to water vapor: 8 mg/cm$^3$.h
Scrubb test, 1000 strokes, wet: no damage.

EXAMPLE 9

(I) Undercoat

Spreading paste according to Example (2/I).

(II) Topcoat 1190 g of a polyester of 1,6-hexane diol, neopentyl glycol (glycol ratio=65:35) and adipic acid (OH number 66) and 176 g of perfluorooctane-sulfonic-acid-N,N-bis-(2-hydroxyethyl)-amide were reacted with 490 g of isophorone diisocyanate at 100°–110° C. to form an NCO-prepolymer. An NCO value of 5.2% was reached after a reaction time of 2 hours. The prepolymer melt was dissolved in 2400 g of toluene, cooled to 25° C. and diluted with 1200 g of isobutanol. A solution of 205 g of isophorone diamine in 1200 g of isobutanol was added dropwise while cooling. A 30% solution having a viscosity (at 25° C.) of approx. 45,000 mPas was obtained. The topcoat paste prepared therefrom as in (6/II) had a solids content of approx. 15% and a viscosity (at 25° C.) of 17,000 mPas.

(III) Direct coating

A 100 g/m³ polyamide fabric was coated with the undercoat paste (2/I) using an air knife, after which the topcoat paste (9/I) was applied by doctor rolls (working conditions as in (2/III).
Total coating weight: 35 g/m³
Resistance to water:
 original: 1600 mm WC
 30° C. wash: 1300 mm WC
 dry cleaning: 1100 mm WC
Permeability to water vapor: 7 mg/cm³.h
Scrubb test, 1000 strokes, wet: no damage.

EXAMPLE 10

(I) Undercoat

Spreading paste according to Example (2/I).

(II) Topcoat

After dehydration, 1785 g of a polyester of diethylene glycol and adipic acid (OH number 44), 170 g of a α,ω-bis-hydroxymethylpolydimethylsiloxane (OH number 99) and 88 g of perfluorooctane-sulfonic-acid-N,N-bis-(2-hydroxyethyl)-amide were reacted at 110° C. with 710 g of isophorone diisocyanate to an NCO value of 6.4%. The prepolymer melt was dissolved in 3650 g of toluene and cooled to 25° C. A solution of 374 g of isophorone diamine in 3650 g of isobutanol was then added dropwise. After a viscosity of 30,000 mPas had been reached, the reaction was terminated by the addition of 20 g of butanone oxime, followed by stirring for 2 hours at 50° C. A 30% polyurethane urea solution having a viscosity (25° C.) of 35,000 mPas was obtained.

810 g of this solution were diluted with 165 g of toluene, after which 25 g of the aqueous melamine resin solution described in (1/II) and 5 g of the silicone resin described in (3/II) were added. An aqueous solution of 6 g of commercial carboxymethyl cellulose (Walocel MT 4000 GB, Wolff-Walsrode AG), 12 g of triethanolamine and 82 g of water were then stirred in and 750 g of water subsequently added with intensive stirring. The approx. 15% spreading paste had a viscosity (at 25° C.) of approx. 10,000 mPas.

Using the undercoat paste (2/I) and the topcoat (10/I), coatings permeable to water vapor were obtained by direct coating on fabrics of natural and synthetic fibers.
Permeability to water vapor: 5-10 mg/cm³.h
Resistance to water: >1000 mm WC.

EXAMPLE 11

(I) Undercoat 900 g of a polytetramethylene glycol polyether (OH number 112) and 56 g of a, -bis-hydroxymethyl-polydimethylsiloxane (OH number 200) were dehydrated and then reacted with 625 g of 4,4'-diisocyanatodiphenylmethane at 100° C. to an NCO-value of 7.9%. After dilution with 800 g of methylethylketone, 74.5 g of ethylene glycol were added and the mixture subsequently stirred at 80° C. until an NCO-value of 1.0% was reached. The mixture was then diluted with another 2850 g of methylethylketone and cooled to 25° C. A solution of 15 g of hydrazine hydrate in 250 g of water was then added dropwise at that temperature, followed by stirring for 3 hours at 50° C. A cloudy, but homogeneous solution having a solids content of 30% and a viscosity (at 25° C.) of approx. 20,000 mPas was formed. The undercoat paste prepared therefrom as in (1/II) had a solids content of approx. 15% and a viscosity (at 25° C.) of approx. 10,000 mPas.

(II) Topcoat 2240 g of a dehydrated polyester of 1,4-butane diol and adipic acid (OH number 50) were reacted with 666 g of isophorone diisocyanate and 340 g of isophorone diamine in a reaction screw at temperatures of 80° to 180° C. The extruded melt strand was granulated after cooling.

300 g of this polyurethane urea granulate were dissolved in 350 g of toluene and 350 g of isobutanol. The 30% solution had a viscosity (at 25° C.) of 35,000 mPas.

300 g of this solution were mixed with 510 g of the polyurethane urea solution according to Example (1/I) and 165 g of toluene. 20 g of the melamine resin solution described in (1/II) and 5 g of the fluorocarbon resin solution described in (1/III) were then added. In addition, 100 g of the neutralized aqueous polyacrylic acid dispersion described in (1/II) and 750 g of water were successively added with thorough stirring. The topcoat paste thus obtained had a viscosity (at 25° C.) of approx. 12,000 mPas and a solids content of approx. 15%.

Using the undercoat paste (11/I) and the topcoat paste (11/II), coatings permeable to water vapor were obtained on fabrics of natural and synthetic fibers by the method described in Example 1.
Permeability to water vapor: 7-10 mg/cm³.h
Resistance to water: >1200 mm WC.

EXAMPLE 12

(I) Undercoat 1000 g of the 30% polyurethane solution described in Example (5/I) were diluted with 50 g of toluene and 50 g of isobutanol. 20 g of the blocked polyisocyanate described in (1/II) and 15 g of the melamine resin described in (1/II) were then added to this dilute solution. In addition, 100 g of a 40% polyacrylate solution in ethylacetate (copolymer of 95% by weight of ethylacrylate, 2.5% by weight of acrylic acid and 2.5% by weight of -hydroxypropylacrylate), 10 g of a 20% solution of p-toluene sulfonic acid in isopropanol and 100 g of an aqueous ammonia solution (10% by weight of ammonia conc., 90% by weight of water) were added. A two-phase spreading paste having a viscosity of approx. 18,000 mPas/25° C. was ultimately obtained by the addition of 700 g of water.

(II) Topcoat 1000 g of the 30% polyurethane solution described in Example (5/II) were diluted with 50 g of toluene and 50 g of isobutanol as described in (12/I) undercoat. 20 g of the melamine resin described in Example (1/II), 50 g of the 40% polyacrylate solution in ethylacetate described in (12/I) undercoat, 10 g of a 20% solution of p-toluene sulfonic acid in isopropanol and 100 g of an aqueous ammonia solution were then added to this solution as described in (12/I) undercoat. After stirring in 900 g of water, a viscous two-phase spreading paste having a viscosity of 15,000 mPas/25° C. was obtained.

(III) Direct coating

As in Example (3/III), the spreading paste (12/I) and then the topcoat paste (12/II) were applied to the polyester fabric.

Total coating weight: 35 g/m²
Resistance to water:
 original: 2000 mm WC
 30° C. wash 1×: 1600 mm WC
 dry cleaning 1×: 1200 mm WC
Permeability to water vapor: 8 mg/cm³.h
Scrubb test, 1000 strokes, wet: no damage.

EXAMPLE 13

(I) Undercoat 1000 g of the 30% polyurethane solution described in Example (5/I) were diluted with 50 g of toluene in 50 g of isobutanol. 20 g of the blocked polyisocyanate described in (1/II) and 15 g of the melamine resin described in (1/II) were then added to this dilute solution. In addition, 10 g of a 20% solution of p-toluene sulfonic acid in isopropanol and 100 g of an aqueous ammonia solution (10% by weight of ammonia conc., +90% by weight of water) were added. A two-phase spreading paste having a viscosity of 20,000 mPas/25° C. was ultimately obtained by the addition of 700 g of water.

(II) Topcoat 1000 g of the 30% polyurethane solution described in Example (5/II) were diluted with 50 g of toluene and 50 g of isobutanol as described in (12/I). 20 g of the melamine resin described in Example (1/II), 10 g of a 20% solution of p-toluene sulfonic acid in isopropanol and 100 g of an aqueous ammonia solution were then added to this solution as in (12/I). After stirring in 100 g of water, a viscous two-phase spreading paste having a viscosity of approx. 18,000 mPas at 25° C. was obtained.

(III) Direct coating

As in Example (3/III), the spreading paste (13/I) was applied as undercoat and the spreading paste (13/II) as topcoat to a polyester fabric.

Total coating weight: 35 g/m²
Resistance to water:
 original: 2000 mm WC
 30° C. wash 1×: 1800 mm WC
 dry cleaning 1×: 1000 mm WC
Permeability to water vapor: 4 mg/cm³.h
Scrubb test, 1000 strokes, wet: no damage.

EXAMPLE 14

(I) Undercoat paste

Spreading paste according to Example (12/I).

(II) Topcoat 1000 g of the 30% polyurethane solution described in Example (8/II) were diluted with 50 g of toluene and 50 g of isobutanol. 20 g of the melamine resin described in Example (1/II) and 10 g of a 20% solution of p-toluene sulfonic acid and 100 g of an aqueous ammonia solution were added to this solution as in (12/I). After stirring in 900 g of water, a viscous two-phase spreading paste having a viscosity of approx. 18,000 mPas/25° C. was obtained.

(III) Direct coating

As in Example (3/III), spreading paste (14/I) was applied as undercoat and spreading paste (14/II) as topcoat to a polyester fabric.

Total coating weight: 30 g/m²
Resistance to water:
 original: 1800 mm WC
 30° C. wash 1×: 1500 mm WC
 dry cleaning 1×: 1000 mm WC
Permeability to water vapor: 6 mg/cm³.h
Scrubb test, 1000 strokes, wet: no damage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a coating permeable to water vapor on a fabric or leather substrate which comprises applying an optionally pigmented spreading paste comprising a multiphase mixture of
   (A) about 5 to 50% by weight of a hydrophobic polyurethane and/or polyurethane urea wherein a synthesis component comprising a member selected from the group consisting of silicone resins, polyethers containing aromatic segments, polyesters containing aromatic segments and perfluorocarbon resins is used in an amount sufficient for said polyurethane and/or polyurethane urea to contain about 1 to 30% by weight of said synthesis component,
   (B) 0 to about 30% by weight of a hydrophobic polyurethane and/or polyurethane urea which has not been synthesized with said synthesis component,
   (C) about 4.5 to 50% by weight of an organic solvent suitable for solubilizing components (A) and (B),
   (D) 0 to about 40% by weight of an organic non-solvent which will not solubilize components (A) and (B),
   (E) 0 to about 10% by weight of a polymer which does not contain either urethane or urea groups and which does contain a carboxyl group completely or partly neutralized with a base,
   (F) about 10 to 70% by weight of water and
   (G) 0 to about 5% by weight of a crosslinking agent, hydrophobicizing agent or stabilizer, to a fabric or leather substrate by the direct or transfer method and subsequently curing the coating using the technique of evaporation coagulation.

2. The process of claim 1 wherein said synthesis component is used in an amount sufficient for said polyurethane and/or polyurethane urea to contain about 1 to 20% by weight of said synthesis component.

3. The process of claim 2 wherein said synthesis component contains polysiloxane segments and at least two isocyanate-reactive groups.

4. The process of claim 2 wherein said synthesis component is a hydroxy functional polyether obtained by the alkoxylation of an aromatic compound containing at least two phenolic hydroxyl groups and less than 10% by weight, based on the weight of said hydroxy functional polyether, of oxyethylene segments, —CH$_2$—CH$_2$—O—.

5. The process of claim 2 wherein said synthesis component is a polyester containing at least two hydroxyl groups and which is based on an isomer of phthalic acid.

6. The process of claim 2 wherein said synthesis component is a compound containing perfluoroalkyl groups and at least two isocyanate-reactive groups.

7. The process of claim 1 wherein said organic solvent (C) is an alcohol and/or a ketone containing 4 to 6 carbon atoms and said organic nonsolvent (D) is an aromatic and/or aliphatic hydrocarbon containing 6 to 10 carbon atoms and/or a fatty acid ester containing from 3 to 7 carbon atoms.

8. The process of claim 1 wherein component (E) comprises a member selected from the group consisting of homopolymers of a polyacrylic acid, homopolymers of a polymethacrylic acid, copolymers of a polyacrylic acid, copolymers of a polymethacrylic acid, cellulose derivatives containing carboxyl groups which are completely neutralized and cellulose derivatives containing carboxyl groups which are partly neutralized.

9. The process of claim 1 wherein said spreading paste is based on
(A) about 5 to 30% by weight of a hydrophobic polyurethane urea which comprises
(1) about 10 to 40% by weight of an aliphatic polyisocyanate and
(2) at least about 40% by weight of an aliphatic polyhydroxyl compound having a molecular weight of about 500 to 5000 and
at least one member selected from the group consisting of
(3a) 0 to about 15% by weight of dihydroxymethylpolydimethylsiloxanes having a molecular weight of about 300 to 3,000,
(3b) 0 to about 15% by weight of an alkoxylated bis-(hydroxyphenyl)-alkane having a molecular weight of about 300 to 2,000,
(3c) 0 to about 15% by weight of a polyester having a molecular weight of about 230 to 2,000 and based on an isomer of phthalic acid and
(3d) 0 to about 15% by weight of a diol containing perfluoroalkyl groups with at least three perfluorinated carbon atoms and having a molecular weight of about 300 to 2,000,
the percentage of synthesis components (3a) to (3d) totaling about 1 to 20% and
(4a) 0 to about 20% by weight of a polyhydroxyl compound having a molecular weight of 62 to 399,
(4b) about 2 to 20% by weight of a polyamine and/or hydrazine or a derivative thereof having a molecular weight of 32 and from 62 to 399 and
(C) about 4.5 to 40% by weight of an alcohol or ketone containing 4 to 6 carbon atoms,
(D) at least about 5% by weight of an aromatic or aliphatic hydrocarbon containing from 6 to 10 carbon atoms and/or a fatty acid ester containing from 3 to 7 carbon atoms,
(E) about 0.5 to 5% by weight of a poly(meth)acrylic acid or poly(meth)acrylic acid copolymer which is at least partly neutralized with a base and
(F) about 20 to 60% by weight of water.

10. The coated substrate produced in accordance with claim 1.

* * * * *